No. 668,260. Patented Feb. 19, 1901.
K. LEHNER.
ELECTRICAL MEASURING INSTRUMENT.
(Application filed Feb. 16, 1899.)
(No Model.)
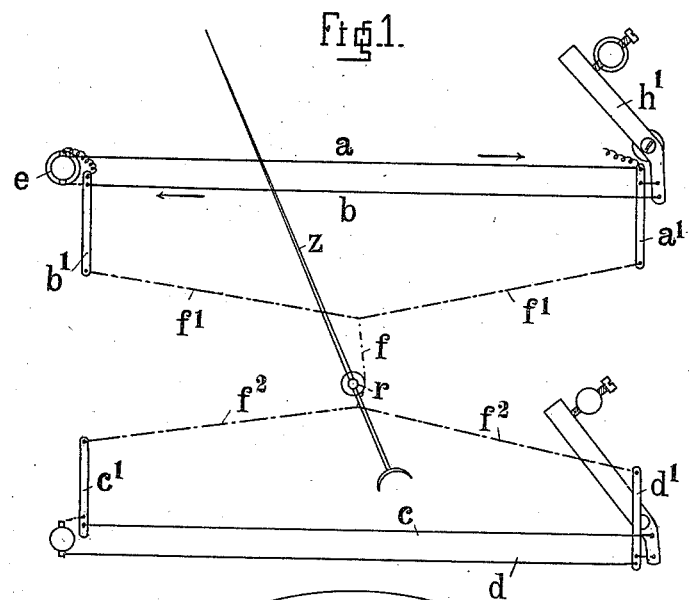
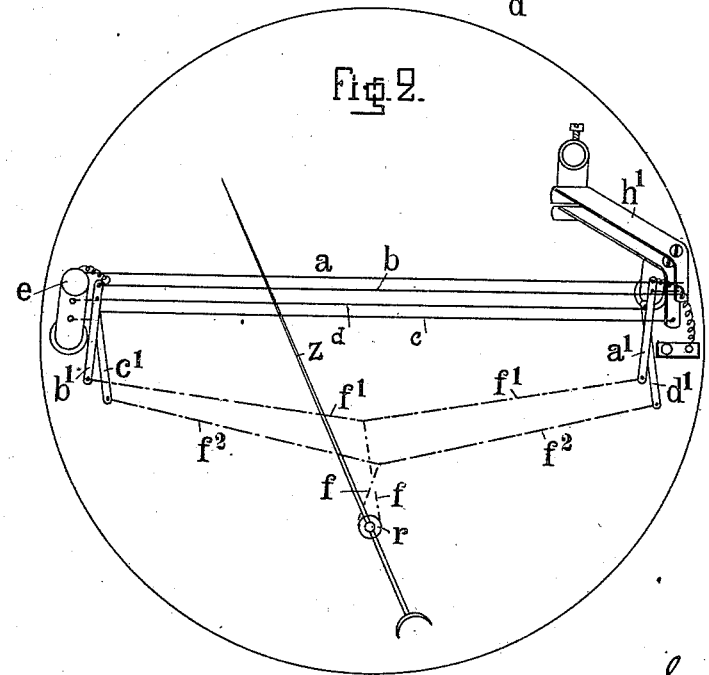

UNITED STATES PATENT OFFICE.

KARL LEHNER, OF FRANKFORT-ON-THE-MAIN, GERMANY.

ELECTRICAL MEASURING INSTRUMENT.

SPECIFICATION forming part of Letters Patent No. 668,260, dated February 19, 1901.

Application filed February 16, 1899. Serial No. 705,662. (No model.)

*To all whom it may concern:*

Be it known that I, KARL LEHNER, a subject of the Emperor of Germany, and a resident of Frankfort-on-the-Main, Germany, have invented certain new and useful Improvements in Electrical Measuring Instruments, of which the following is a specification.

This invention relates to an electrical measuring instrument by means of which the work effected by a current in a unit of time may be measured. This improved measuring instrument is based on Joule's law, according to which, as is well known, the quantity of heat produced by the current is taken as the measure for the work delivered. In such instruments, as is well known, by the heating of a portion of the conductor an indicating mechanism is turned in such a way that the respective portion of the wire is maintained constantly stretched by means of a spring or a weight at its extension, and the movement of the spring or weight is transmitted in a suitable and ordinary manner to the spindle of the pointer.

In the improved measuring instrument which forms the object of this invention the spring or weight system is replaced by a second series of wires acting in an opposite direction, which wires, however, are not traversed by the electric current. Both sets of wires are always under the action of such a quantity of heat as corresponds to the actual conditions of moisture and temperature existing.

This improved measuring instrument is shown in the accompanying drawings.

Figure 1 is a front view of one form of construction, and Fig. 2 a view in perspective of a second form of construction.

The measuring-wire $a$ to be heated by the current is formed of platinum or silver and connected at one end firmly with a small pillar $e$, while the other end is attached to the shorter arm of a lever $a'$. The lever $a'$ at its point of rotation is pivotally connected with a stretching and setting angle-piece $h'$ by means of a link, as a silk thread. The end of the angle-piece is also connected by a wire $b$ with a second lever $b'$, and the point of rotation of the latter lever is connected with the pillar $e$ by means of a silk thread. In a similar manner a second set of wires $c$ $d$ is connected with levers $c'$ $d'$, supported by silk threads. The longer ends of the levers $a'$ $b'$ and also of the levers $c'$ $d'$ are connected by means of flexible connections, as by silk threads $f'$ $f^2$. The oppositely-directed center points of the threads $f'$ $f^2$ are connected to a roller on the spindle $r$ of the pointer $z$ by means of a further silk thread $f$ connecting the centers of the two said threads $f'$ $f^2$. The pointer $z$ moves over an empirical scale formed on the measuring instrument and indicates directly the energy delivered by the current. The current-supply to the measuring-wires $a$ and $b$, as well as the carrying off of the current from the said wires, takes place by means of easily flexible or yielding thin silver or platinum spirals. The current enters wire $b$ at the point of its attachment to angle-piece $h'$ and after traversing the wire in the direction of the arrow reaches wire $a$ by means of the platinum spiral electrically connecting the two wires. The current in wire $a$ is in the direction of the arrow, and it leaves the wire by means of the platinum spiral on the right.

When the apparatus is free from current, the pairs of wires $a$ $b$ and $c$ $d$ under the influence of an outer temperature, which is even for the whole apparatus, maintains an equipoise under the mutual tension caused by the adjustment of the silk threads $f f' f^2$ by means of the pairs of levers $a' b' c' d'$ at the zero-point of the indicating-scale. As soon, however, as the wires $a$ and $b$ are traversed by a current they receive a moderate extension, so that their tension diminishes. The tension remains unaltered in the wires $c$ $d$, which are not traversed by current—that is to say, the tension in the wires $c$ and $d$ is then greater than in the wires $a$ and $b$. This excess of tension by means of the levers $a' b' c' d'$ and the silk threads $f f' f^2$ effects a rotary movement of the indicator or pointer $z$.

In Fig. 2 the same parts are shown as similarly lettered, and the operation is substantially the same, the arrangement being slightly different, as is clearly indicated. In this figure the wires $c$ $d$ are rotated one hundred and eighty degrees about an axis parallel to themselves and passing through the spindle $r$, so that these wires are brought into close proximity to the wires $a$ $b$. The pointer $z$ is suspended by a loop in the silk thread $f$, and the whole apparatus occupies one-half the space it previously occupied. The wires $a$ and $d$ are connected at the left to the common pillar $e$ and on the right to the shorter arms of the levers $a'$ and $d'$, respectively, the left end of wire $d$ in the drawings being shown directly behind the link of silk thread which connects lever $b'$ to pillar $e$. The wires $b$ and $c$ are connected at the right to their angle-pieces $h'$ and at the left to the shorter arms of the levers $b'$ and $c'$, respectively. The upper link (shown in dotted lines) at the left connects the lever $b'$ with pillar $e$, while the lower link connects lever $c'$ with pillar $e$. On the right silk threads connect the levers $a'$ and $d'$ with their respective angle-pieces. Flexible connections $f'$ and $f^2$ connect the ends of the levers as before.

The electric current traverses wires $b$ and $a$ in Fig. 2 in the same manner and direction that it does in Fig. 1, and the consequent direction of movement of pointer $z$ is the same in each figure.

Having now particularly described and ascertained the nature of my said invention and in what manner the same is to be performed, I declare that what I claim is—

1. A measuring instrument for indicating the energy of an electric current on Joule's principle, comprising two fixed supports and two levers, each lever pivotally connected to the adjacent support by a link and to the opposite support by a conductor-wire, a flexible connection between the free ends of the levers, a pointer connected therewith, and means connected with the pointer acting in opposition to said flexible connection, substantially as described.

2. A measuring instrument for indicating the energy of an electric current on Joule's principle, comprising two fixed pillars, two adjustable angle-pieces, a lever connected to each pillar and each angle-piece, a wire connected to each pillar and to one of the levers, a wire connected to each adjustable angle-piece and to another lever, two wires each connecting the free ends of two of such levers, a connection between said wires, and a pointer arranged to be controlled by said connection, substantially as described.

In testimony whereof I have signed my name to this specification in the presence of two subscribing witnesses.

KARL LEHNER.

Witnesses:
FRANZ HASSLACHER,
MICHAEL VOLK.